(12) United States Patent
Su et al.

(10) Patent No.: US 8,396,684 B2
(45) Date of Patent: Mar. 12, 2013

(54) METHOD AND SYSTEM FOR MOTION TRACKING

(75) Inventors: Chao-Min Su, Hsinchu (TW); Tsun-Chieh Chiang, Changhua County (TW); Chih-Wei Yi, Hsinchu County (TW); Wen-Tein Chai, Yunlin County (TW); Pin-Chuan Liu, Hsinchu (TW); Jiun-Long Huang, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 569 days.

(21) Appl. No.: 12/762,932

(22) Filed: Apr. 19, 2010

(65) Prior Publication Data

US 2011/0048103 A1 Mar. 3, 2011

(30) Foreign Application Priority Data

Sep. 3, 2009 (TW) ................................ 98129645 A

(51) Int. Cl.
*G01B 21/22* (2006.01)
*G01P 21/00* (2006.01)
*G01P 15/18* (2006.01)
*G06F 17/16* (2006.01)

(52) U.S. Cl. ............ 702/151; 73/510; 701/300; 702/94; 702/150; 702/152; 702/196

(58) Field of Classification Search .................. 73/1.79, 73/510; 701/300; 702/92–94, 150–152, 702/196, FOR. 144

See application file for complete search history.

(56) References Cited

U.S. PATENT DOCUMENTS

| | | | |
|---|---|---|---|
| 6,729,176 B2 * | 5/2004 | Begin ............................. 73/1.38 |
| 7,106,189 B2 * | 9/2006 | Burneske et al. ......... 340/539.13 |
| 7,626,499 B2 * | 12/2009 | Burneske et al. ......... 340/539.13 |
| 8,246,467 B2 * | 8/2012 | Huang et al. .................... 463/42 |
| 2010/0109950 A1 * | 5/2010 | Roh ......................... 342/357.14 |
| 2010/0121599 A1 * | 5/2010 | Boeve et al. ..................... 702/93 |
| 2011/0304537 A1 * | 12/2011 | Eruchimovitch et al. ..... 345/158 |
| 2012/0316819 A1 * | 12/2012 | Martell et al. ................... 702/94 |

OTHER PUBLICATIONS

Jeng-Heng Chen et al., Gyroscope Free Strapdown Inertial Measurement Unit by Six Linear Accelerometers, Journal of Guidance Control and Dynamics, Mar.-Apr. 1994, pp. 286-290, vol. 17, No. 2, limited legibility.

\* cited by examiner

*Primary Examiner* — Thomas P Noland

(74) *Attorney, Agent, or Firm* — Morris Manning & Martin LLP; Tim Tingkang Xia, Esq.

(57) ABSTRACT

A method and a system for motion tracking, capable of tracking a trajectory of a movable object by an architecture having at least three accelerometers arranged in a predefined structure. The trajectory, displacement and rotational angle of the movable object are determined by ways of extrapolation, numerical calibration and vector transformation according to the acceleration signals detected by the at least three accelerometers.

15 Claims, 7 Drawing Sheets

METHOD AND SYSTEM FOR MOTION TRACKING

CROSS-REFERENCE TO RELATED PATENT APPLICATION

This application claims priority to and the benefit of Taiwan Patent Application No. 098129645, filed Sep. 3, 2009, the contents of which are incorporated herein in their entireties by reference.

FIELD OF THIS DISCLOSURE

This disclosure generally relates to a trajectory tracking technology and, more particularly, to a method and a system for motion tracking based on inertia detection.

BACKGROUND OF THIS DISCLOSURE

With the advancement in technologies, object tracking and trajectory reconstruction have been widely used in, for example, traffic accident reconstruction, navigation of aerocrafts and trajectory evaluation, positioning aiding and game control. In object tracking and trajectory reconstruction, the rotational angle and the displacement of the object are given with the use of inertial measurement units.

Conventionally, an object tracking and trajectory reconstruction system generally comprises inertial measurement units. The inertial measurement units may comprise a gyroscope, an accelerometer and a magnetic compass. More particularly, the gyroscope is capable of detecting the angular velocity to calculate the rotational angle of an object. The accelerometer is capable of detecting the acceleration to calculate the displacement of the object. The magnetic compass is capable of detecting the absolute orientation to obtain the rotational angle of the object.

In U.S. Pub. No. 2008/0046214, a sensor system is disclosed using gyroscopes, accelerometers and magnetic compasses to detect the orientation and status of an object. Moreover, U.S. Pat. No. 4,038,527 also discloses a technology for detecting the status and the orientation of a movable object using gyroscopes and accelerometers. Moreover, U.S. Pat. No. 6,842,991 also discloses a technology for detecting the status and the orientation of a movable object using gyroscopes and magnetic compasses. However, since the gyroscope is expensive, it is not suitable for daily use. The magnetic compass is easily interfered with surrounding electronic appliances.

In U.S. Pat. No. 5,615,132, a technology for detecting the position and the orientation of an object using six linear accelerometers is disclosed. In U.S. Pat. No. 5,615,132, six accelerometers are used to detect three-dimensional motion status and the orientation of an object. When four accelerometers are used, two-dimensional motion status and the orientation of an object can be detected. Moreover, Chen et al. also disclose a motion status detection technology using six linear accelerometers, entitled "Gyroscope free strapdown inertial measurement unit by six linear accelerometers", (Journal of Guidance, Control, and Dynamics 1994 0731-5090 vol. 17 no. 2(285-290)). More particularly, the six accelerometers are respectively disposed at the center of each edge of a regular tetrahedron. Each of the accelerometers is required to be fixedly positioned and oriented to detect the status and position of the object.

SUMMARY OF THIS DISCLOSURE

In one embodiment, this disclosure provides a method for motion tracking, comprising steps of: providing at least three accelerometers disposed on an object, the at least three accelerometers being provided with a relative position defined between neighboring accelerometers; calculating a second position corresponding to each of the at least three accelerometers by extrapolation after a specific time period according to a first position corresponding to each of the at least three accelerometers and an acceleration value relative to the first position; calibrating the second position according to the relative position defined between the neighboring accelerometers so that each of the accelerometers is provided with a calibrated position; determining a transformation matrix according to the calibrated position and an initial position corresponding to each of the accelerometers; and obtaining a rotational angle of the object according to the transformation matrix.

In another embodiment, this disclosure provides a system for motion tracking, comprising: at least three accelerometers disposed on a movable object and provided with a relative position defined between neighboring accelerometers, each of the accelerometers being provided with an acceleration signal according to the movable object; and a control unit electrically connected to the at least three accelerometers respectively so as to calculate a second position corresponding to each of the at least three accelerometers by extrapolation after a specific time period according to a first position corresponding to each of the at least three accelerometers and an acceleration signal relative to the first position, to calibrate the second position according to the relative position defined between the neighboring accelerometers so that each of the accelerometers is provided with a calibrated position, to determine a transformation matrix according to the calibrated position and an initial position corresponding to each of the accelerometers, and to obtain a rotational angle of the object according to the transformation matrix.

BRIEF DESCRIPTION OF THE DRAWINGS

The objects and spirits of the embodiment of this disclosure will be readily understood by the accompanying drawings and detailed descriptions, wherein.

DETAILED DESCRIPTION OF THIS DISCLOSURE

This disclosure providing a method and a system for motion tracking based on inertia detection can be exemplified by the embodiment as described hereinafter.

This disclosure provides a method and a system for motion tracking that uses an inertial measurement unit composed of at least three accelerometers to track the displacement and 3-D rotational angle of an object without any gyroscope or magnetic compass for angle calculation. In this disclosure, the inertial measurement unit composed of accelerometers is used to track the trajectory of a movable object with lowered cost and immunity from interference by electronic appliances.

Figure 1:
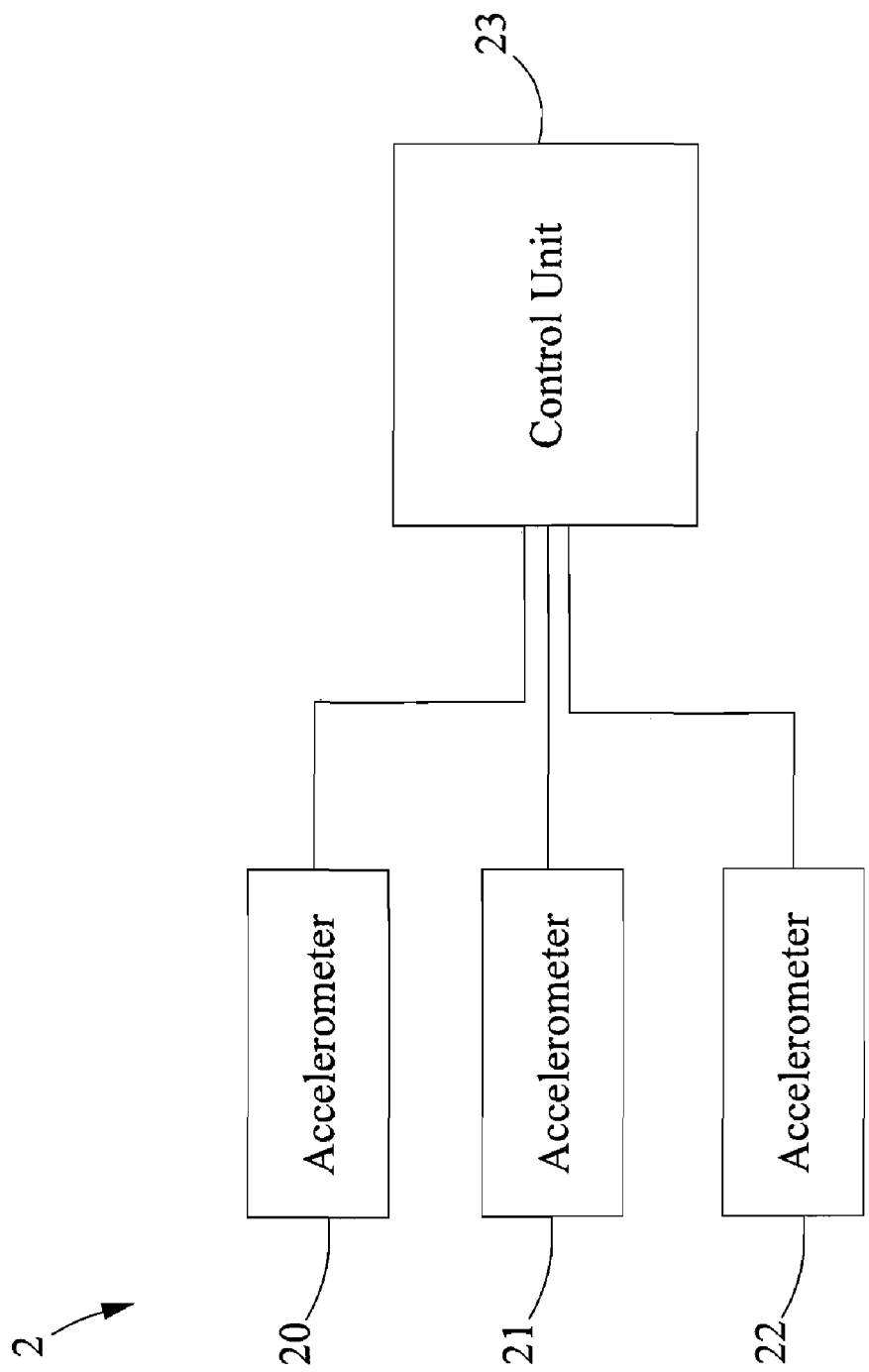
FIG. 1 is a schematic diagram of a system for motion tracking according to one embodiment of this disclosure.

Please refer to FIG. 1, which is a schematic diagram of a system for motion tracking according to one embodiment of this disclosure. The system for motion tracking 2 comprises at least three accelerometers 20, 21 and 22 respectively electrically connected to a control unit 23. Each of the accelerometers 20, 21 and 22 may be a 3-D, 2-D or 1-D accelerometer according to practical demand. For example, a 3-D accelerometer is used for 3-D trajectory tracking, while a 2-D or 1-D accelerometer is used for planar or linear trajectory tracking respectively.

Figure 2:
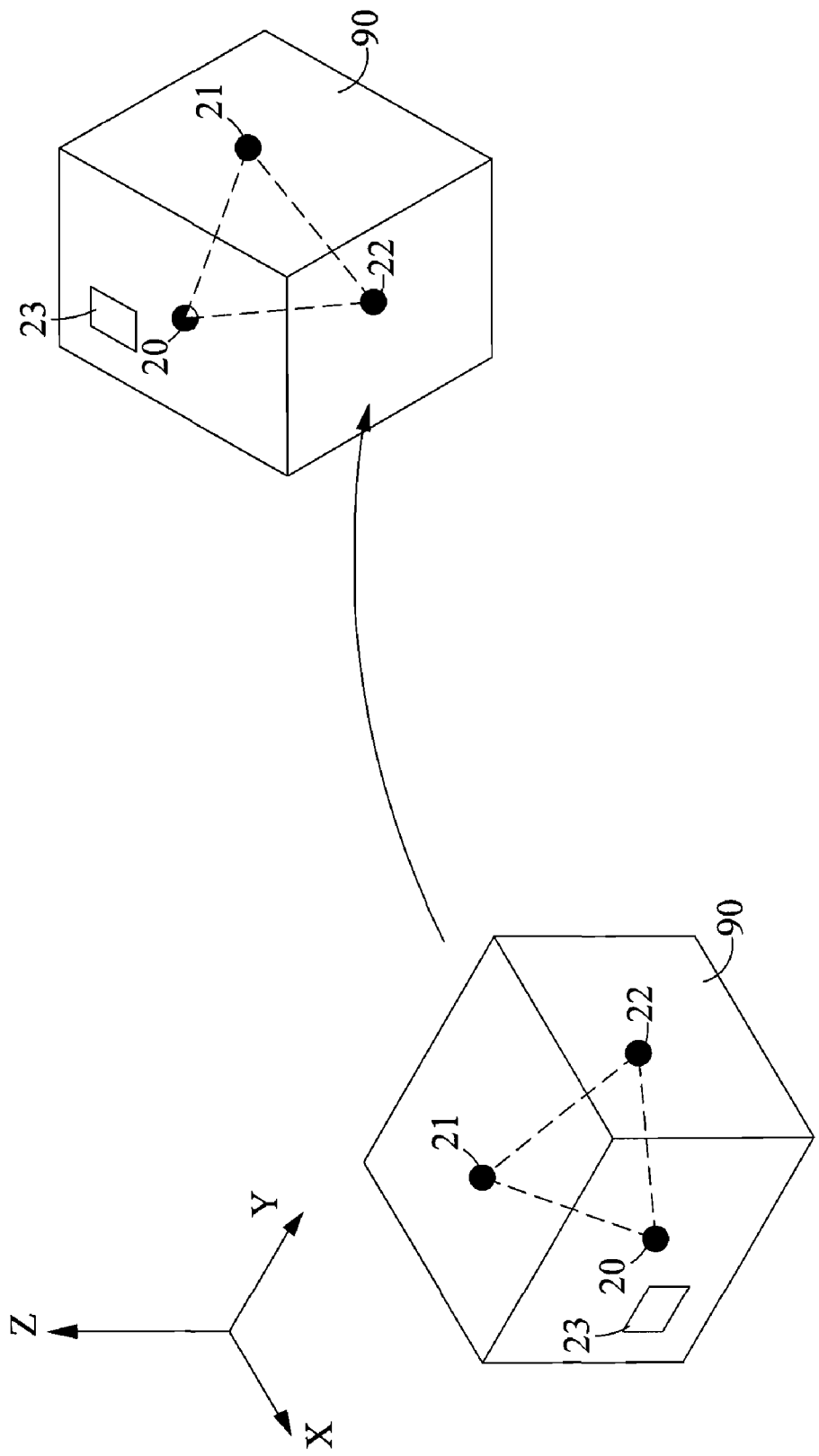
FIG. 2 is a top view of a system for motion tracking disposed on an object according to one embodiment of this disclosure.
Figure 3B:
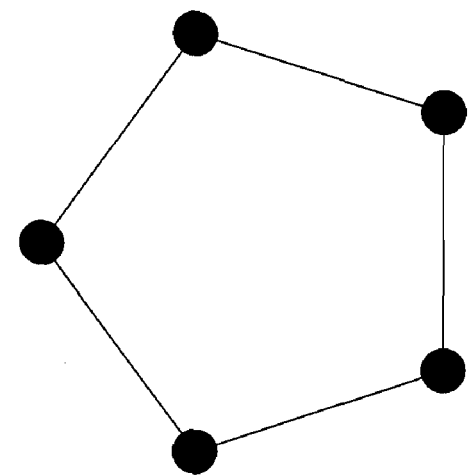
FIG. 3A to FIG. 3D are schematic diagrams showing arrangements of accelerometers.
Figure 3D:
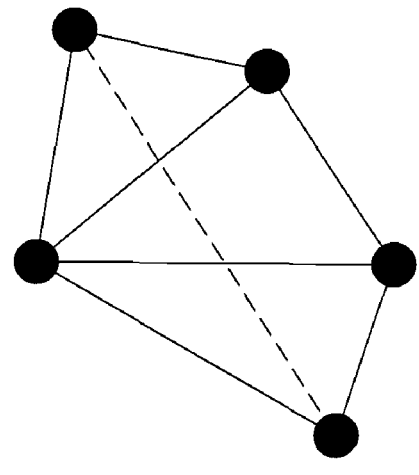
Figure 3A:
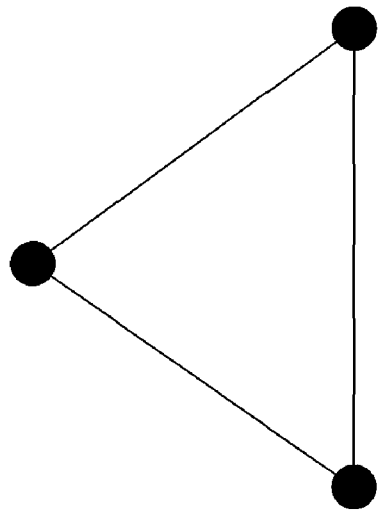
Figure 3C:
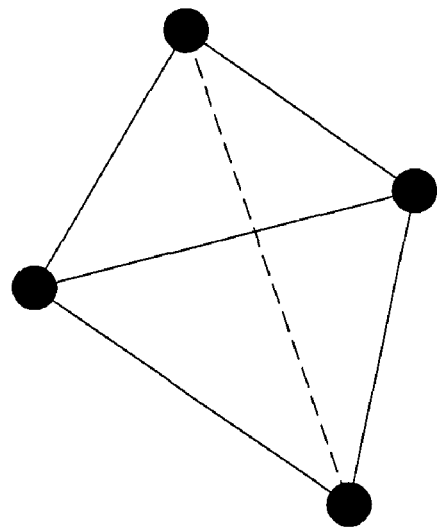

As shown in FIG. 2, a system for motion tracking is disposed on an object according to one embodiment of this disclosure. In the present embodiment, the three accelerometers 20-22 are disposed on a movable object 90, and each of the accelerometers 20-22 is a 3-D accelerometer. The control unit 23 is disposed on the movable object 90 to receive acceleration signals detected by the three accelerometers 20-22 and to obtain the displacement and the rotational angle of the object by extrapolation, numerical calibration (for example, method of least squares) and vector transformation. In FIG. 2, the accelerometers 20-22 are wiredly coupled to the control unit 23. However, in another embodiment, the acceleration signals can be wirelessly transmitted from the accelerometers 20-22 to the control unit 23 for further processes. The control unit 23 can be disposed on the movable object 90 or apart from the movable object 90. The number and arrangement of the accelerometers are designed according to practical use and are not limited to the present embodiment. For example, the accelerometers are arranged as a triangle in FIG. 3A, a pentagon in FIG. 3B. In other words, the accelerometers can be arranged to form a polygon. In FIG. 3C and FIG. 3D, the accelerometers can be arranged to form a polyhedron with a relative distance between neighboring accelerometers.

Figure 4:
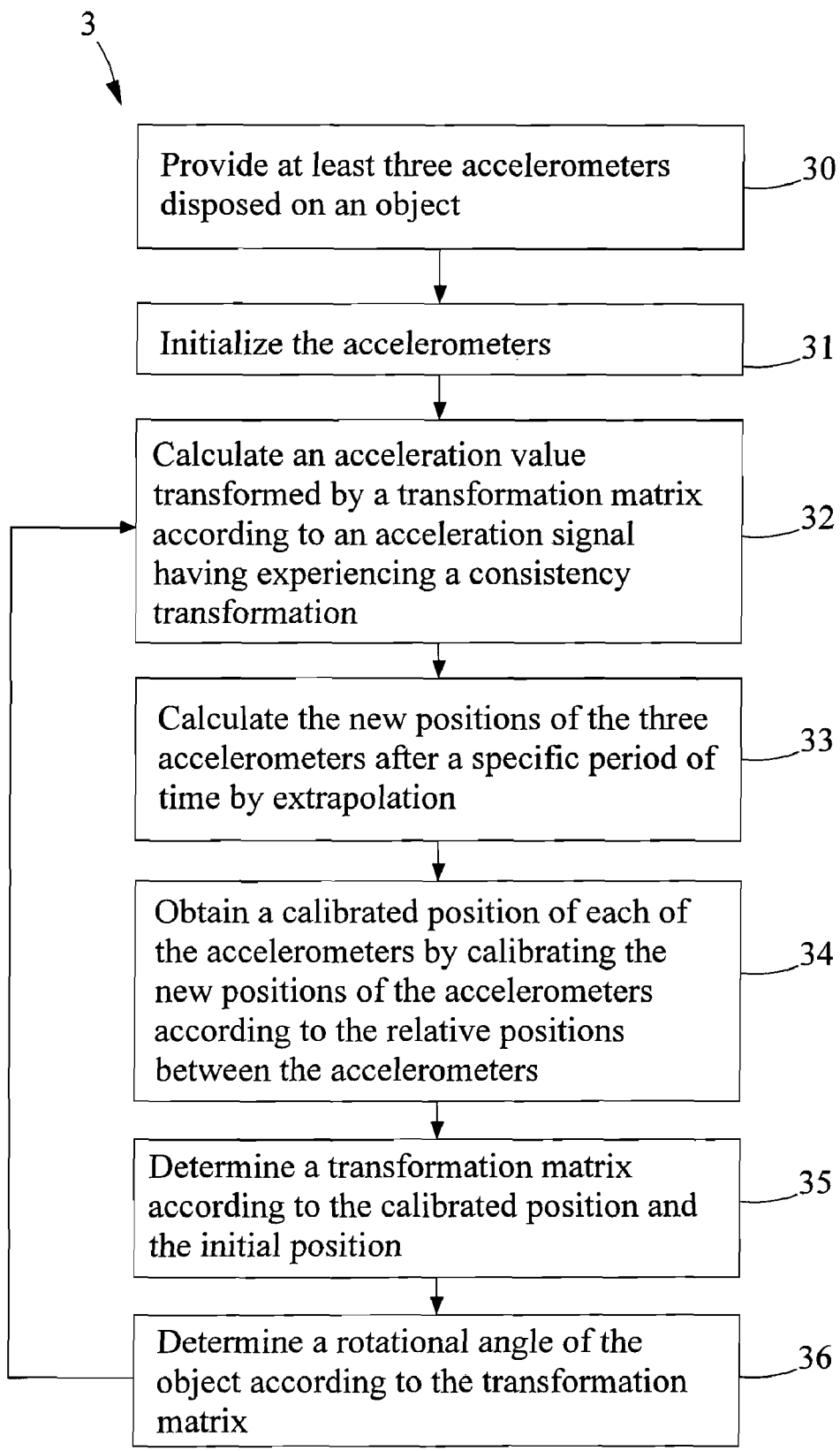
FIG. 4 is a flowchart of a method for motion tracking according to one embodiment of this disclosure.

Please refer to FIG. 4, which is a flowchart of a method for motion tracking according to one embodiment of this disclosure. With the use of the system in FIG. 2, the method 3 comprises steps herein. Firstly, in step 30, three accelerometers 20-22 are disposed on an object 90. Each of the accelerometers 20-22 is a 3-D accelerometer. Then, step 31 is performed to initialize the three accelerometers 20-22 to perform a consistency calibration process on each detection axis of the accelerometers. Moreover, the initial velocity and the position of each of the accelerometers 20-22 are determined as a reference for motion trajectory tracking. The detection axis consistency is calibrated because the detection axes are not consistent when each of the accelerometers is disposed on the object. For example, in FIG. 2, the x-axis of the accelerometer 20 and the x-axis of the accelerometer 21 are not necessarily parallel. Therefore, the detection axis consistency is calibrated by linear transformation so that each of the accelerometers is based on the axes of the first accelerometer 20.

Linear transformation is based on one of the accelerometers. For example, in FIG. 2, a linear transformation matrix $T^{Si \rightarrow S1}$ (or $T^{Si \rightarrow B}$) between the accelerometers 21 and 22 and the accelerometer 20 is obtained based on the accelerometer 20, wherein B denotes a reference coordinate system of the accelerometer 20, $S_i$ denotes a coordinate system of each of the accelerometers. Therefore, an acceleration value along consistent detection axis is obtained after the reading on the accelerometer is multiplied by the linear transformation matrix $T^{Si \rightarrow S1}$ (or $T^{Si \rightarrow B}$), as expressed in Equation (1). Practically, the reading on each of the accelerometers is obtained when the object 90 is stationary. The reading on each of the accelerometers i can be expressed as $\overline{G}_{i,j}$, a 3×1 vector, wherein j denotes each independent direction. Therefore, in FIG. 2, where i=1, 2, 3, $\overline{G}_{1,j}=T^{Si \rightarrow S1}\overline{G}_{i,j}$. $T^{Si \rightarrow S1}$ can be obtained by solving the linear system $\overline{G}_{1,j}=T^{Si \rightarrow S1}\overline{G}_{i,j}$. Accordingly, the signal $\tilde{G}_{i,j}$ measured by the accelerometer has to be multiplied by $T^{Si \rightarrow B}$, as expressed in Equation (1). More particularly, in Equation (1), $T^{S1 \rightarrow B}=T^{S1 \rightarrow S1}=I$, the unit matrix, when i=1 (indicating the accelerometer 20 in FIG. 2).

$$G_{i,j}{}^B = T^{Si \rightarrow B} \tilde{G}_{i,j}, \tag{1}$$

Now, the coordinate system at any time needs to be transformed to the initial coordinate system. In step 32, an acceleration value transformed by a transformation matrix is calculated according to an acceleration signal having experiencing a consistency transformation. The acceleration signal of the moving object 90 is measured by the three accelerometers 20-22. The acceleration value along consistent detection axis is obtained by calculation on the acceleration signal based on Equation (1). Then, the acceleration value along consistent detection axis is transformed by a transformation matrix to obtain a transformed acceleration value corresponding to each of the accelerometers. In step 32, the acceleration signal measured by the accelerometers 20-22 is processed based on Equation (1) to obtain $a_{i,j}$ (i.e., $G_{i,j}{}^B$ in Equation (1)), where i denotes the sensor and j denotes the time, which is then multiplied by the transformation matrix to obtain an acceleration value $A_{i,j}$, where i denotes the sensor and j denotes the time, so as to transform the coordinate system to the initial coordinate system. For example, at time 0, when the acceleration signal measured by the accelerometers 20-22 is processed according to Equation (1) to obtain acceleration values $a_{1,0}$, $a_{2,0}$ and $a_{3,0}$, these acceleration values are multiplied by an initial transformation matrix, as expressed in Equation (2), to obtain acceleration values $A_{1,0}$, $A_{2,0}$ and $A_{3,0}$.

Then, in step 33, the new positions of the three accelerometers after a specific period of time are calculated by extrapolation according to the initial position and the transformed acceleration value of each of the three accelerometers.

$$TM_0 = \begin{bmatrix} 1 & 0 & 0 \\ 0 & 1 & 0 \\ 0 & 0 & 1 \end{bmatrix} \tag{2}$$

Figure 5A:
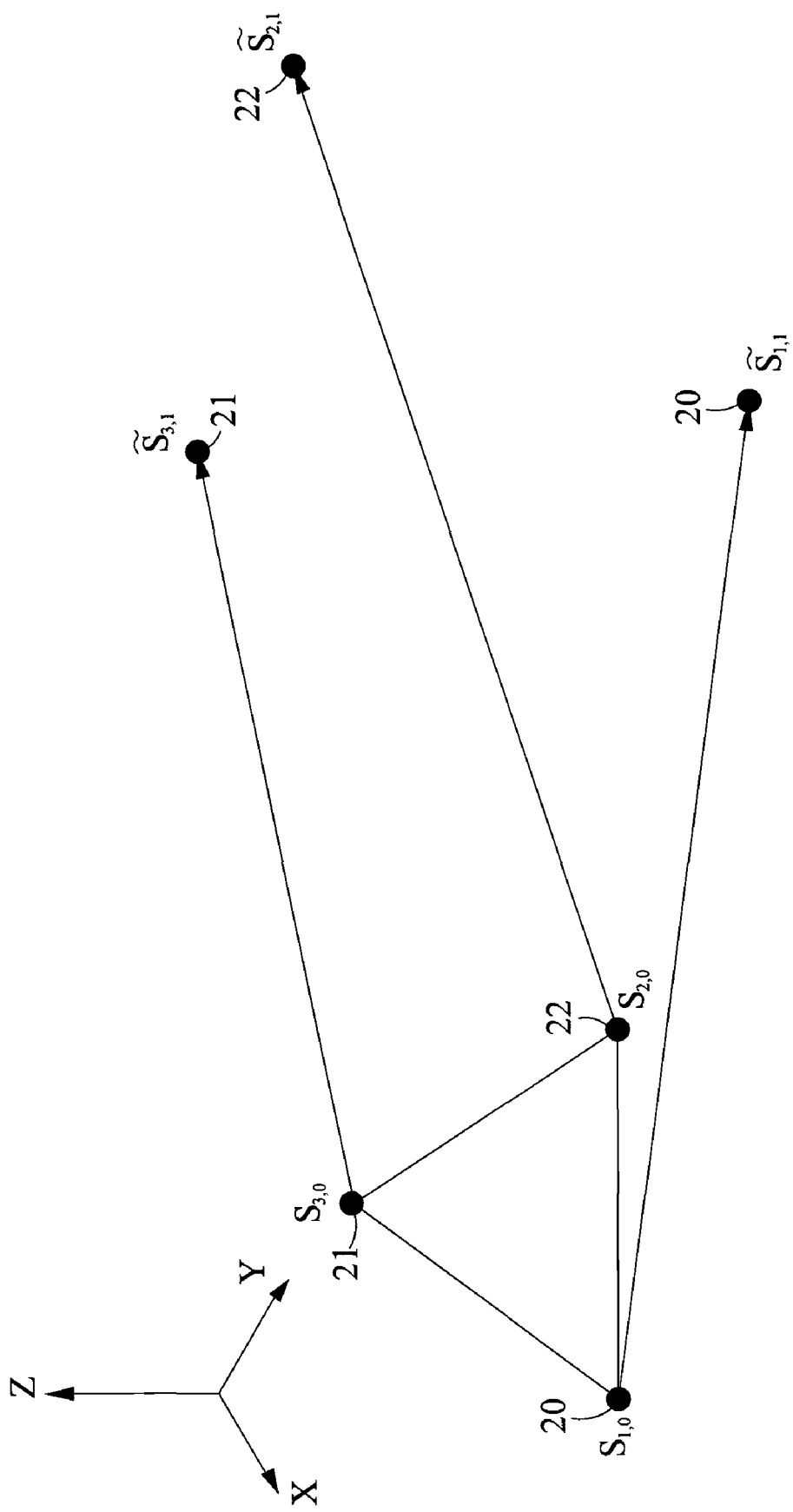
FIG. 5A is a schematic diagram showing calculation of positions according to one embodiment of this disclosure.

Please refer to FIG. 5A, which is a schematic diagram showing calculation of the positions according to one embodiment of this disclosure.

The initial position of the accelerometer 20 at $t_0$ is $S_{1,0}(x_0, y_0, z_0)$, while the acceleration value is $A_{1,0}$ and the velocity is $V_{1,0}$. Similarly, the initial position of the accelerometer 21 at $t_0$ is $S_{2,0}(x_0, y_0, z_0)$, while the acceleration value is $A_{2,0}$ and the velocity is $V_{2,0}$. The initial position of the accelerometer 22 at $t_0$ is $S_{3,0}(x_0, y_0, z_0)$, while the acceleration value is $A_{3,0}$ and the velocity is $V_{3,0}$.

When the object moves for a specific period of time, the position of the accelerometer 20 at $t_1$ is $\tilde{S}_{1,1}(x_1, y_1, z_1)$ by extrapolation. The calibrated position is $S_{1,1}(x_1, y_1, z_1)$, while the transformed acceleration is $A_{1,1}$ and the velocity is $V_{1,1}$. Similarly, the position of the accelerometer 21 at $t_1$ is $\tilde{S}_{2,1}(x_1, y_1, z_1)$. The calibrated position is $S_{2,1}(x_1, y_1, z_1)$, while the transformed acceleration is $A_{2,1}$ and the velocity is $V_{2,1}$. Similarly, the position of the accelerometer 22 at $t_1$ is $\tilde{S}_{3,1}(x_1, y_1,$ $z_1$). The calibrated position is $S_{3,1}(x_1, y_1, z_1)$, while the transformed acceleration is $A_{3,1}$ and the velocity is $V_{3,1}$.

Taking the accelerometers 20-22 for example, the positions $\tilde{S}_{1,1}, \tilde{S}_{2,1}, \tilde{S}_{3,1}$ at $t_1$ by extrapolation are expressed as:

$$\tilde{S}_{1,1} = S_{1,0} + V_{1,0}\Delta t_0 + \frac{1}{2}A_{1,0}(\Delta t_0)^2 \quad (3)$$

$$\tilde{S}_{2,1} = S_{2,0} + V_{2,0}\Delta t_0 + \frac{1}{2}A_{2,0}(\Delta t_0)^2$$

$$\tilde{S}_{3,1} = S_{3,0} + V_{3,0}\Delta t_0 + \frac{1}{2}A_{3,0}(\Delta t_0)^2$$

wherein $\Delta t_0 = t_1 - t_0$. Accordingly, a new position of each of the accelerometers at any time can be expressed as:

$$\tilde{S}_{i,j+1} = S_{i,j} + V_{i,j}\Delta t_j + \frac{1}{2}A_{i,j}(\Delta t_j)^2 \quad (4)$$

wherein $\tilde{S}_{i,j+1}$ denotes a new position of the $i^{th}$ accelerometer at $t_{j+1}$ according to the acceleration $A_{i,j}$ and velocity $V_{i,j}$ at $t_j$ that are processed by extrapolation.

In FIG. 2, even though the accelerometers are disposed equidistantly, the relations between the new positions of the accelerometers by extrapolation in Equation (3) are changed due to deviation and noise. As shown in FIG. 5A, $\tilde{S}_{1,1}(x_1, y_1, z_1)$, $\tilde{S}_{2,1}(x_1, y_1, z_1)$ and $\tilde{S}_{3,1}(x_1, y_1, z_1)$ represent the new positions. However, it is observed that the relative positions between the accelerometers 20-22 at $t_1$ are different from the relative positions between the accelerometers 20-22 at $t_0$. To overcome such deviation caused by extrapolation, step 34 is performed according to the new positions obtained by Equation (4). The second positions (i.e., the new positions) of the accelerometers are calibrated according to the relative positions between the accelerometers so as to obtain a calibrated position of each of the accelerometers. In step 34, the calibrating method is a method of least squares, but is not limited thereto. In other words, conventional algorithms can also be used to calibrate the $\tilde{S}_{1,1}(x_1, y_1, z_1)$, $\tilde{S}_{2,1}(x_1, y_1, z_1)$ and $\tilde{S}_{3,1}(x_1, y_1, z_1)$ to obtain calibrated positions $\tilde{S}_{1,1}(x_1, y_1, z_1)$, $\tilde{S}_{2,1}(x_1, y_1, z_1)$ and $\tilde{S}_{3,1}(x_1, y_1, z_1)$ corresponding to $\tilde{S}_{1,1}(x_1, y_1, z_1)$, $\tilde{S}_{2,1}(x_1, y_1, z_1)$ and $\tilde{S}_{3,1}(x_1, y_1, z_1)$.

Figure 5B:
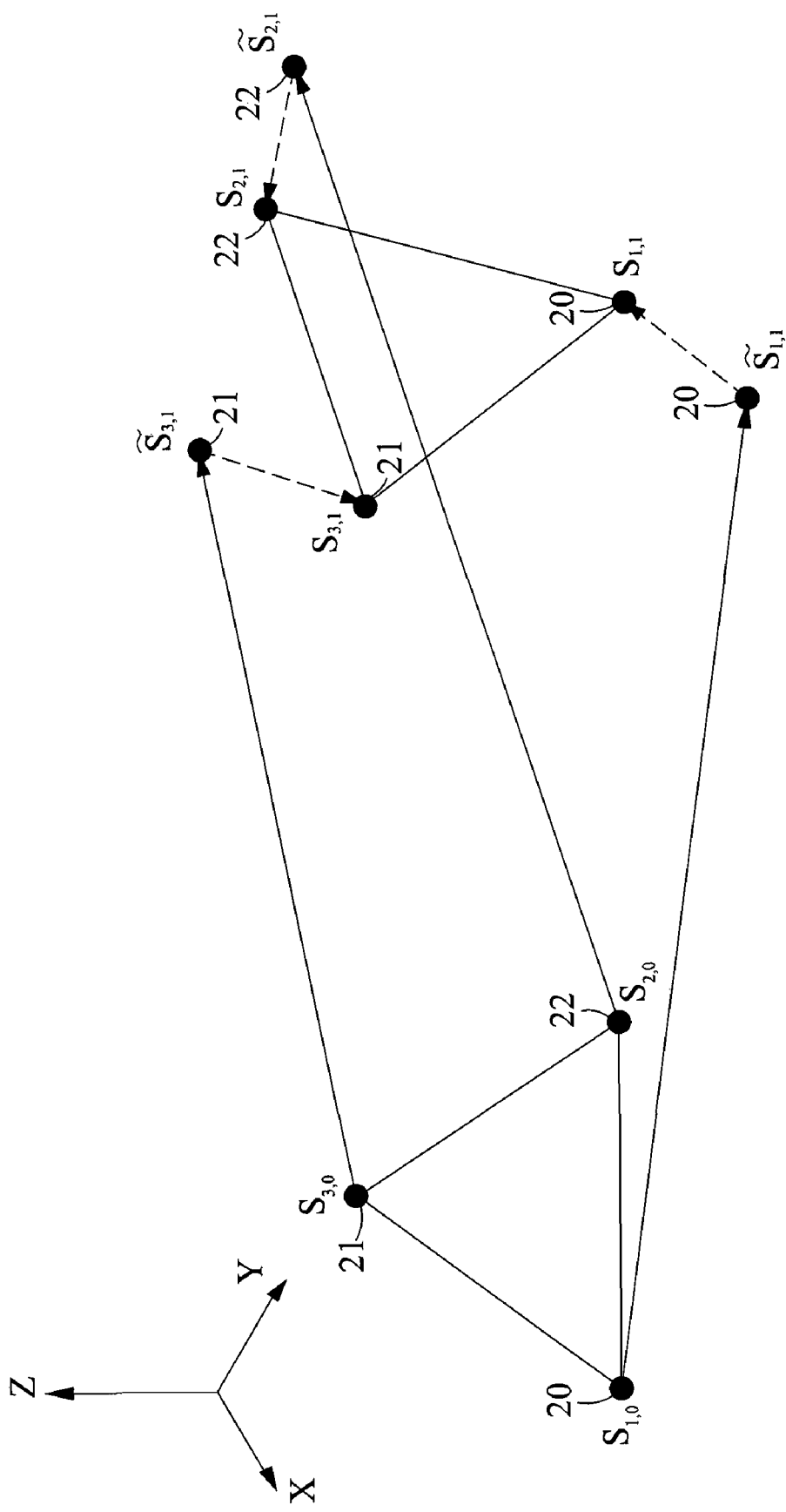
FIG. 5B is a schematic diagram showing calibrated positions according to one embodiment of this disclosure.

The method of least squares can be expressed as:

$$\text{Minimize} \sum_{i=1}^{3} \|S_i - \tilde{S}_i\|^2 \quad (5)$$

where $S_i$ denotes the calibrated position, $\tilde{S}_i$ denotes the new position corresponding to the accelerometer by Equation (4). There are various methods for solving Equation (5) that are conventional and thus descriptions thereof are not to be represented herein. In FIG. 5B, the relative position between the calibrated positions $S_{1,1}(x_1, y_1, z_1)$, $S_{2,1}(x_1, y_1, z_1)$ and $S_{3,1}(x_1, y_1, z_1)$ is identical to the initial relative position between the positions of the accelerometers.

After the calibrated position is obtained, the displacement $D_{i,j}$ and the velocity of the object can be obtained according to the relation between the calibrated position and the position at a previous time. The displacement $D_{i,j}$ and the velocity $V_{i,j}$ can be expressed as:

$$D_{i,j} = S_{i,j+1} - S_{i,j} \quad (6)$$

$$V_{i,j+1} = \frac{2(S_{i,j+1} - S_{i,j})}{\Delta t_j} - V_{i,j} \quad (7)$$

Figure 6:
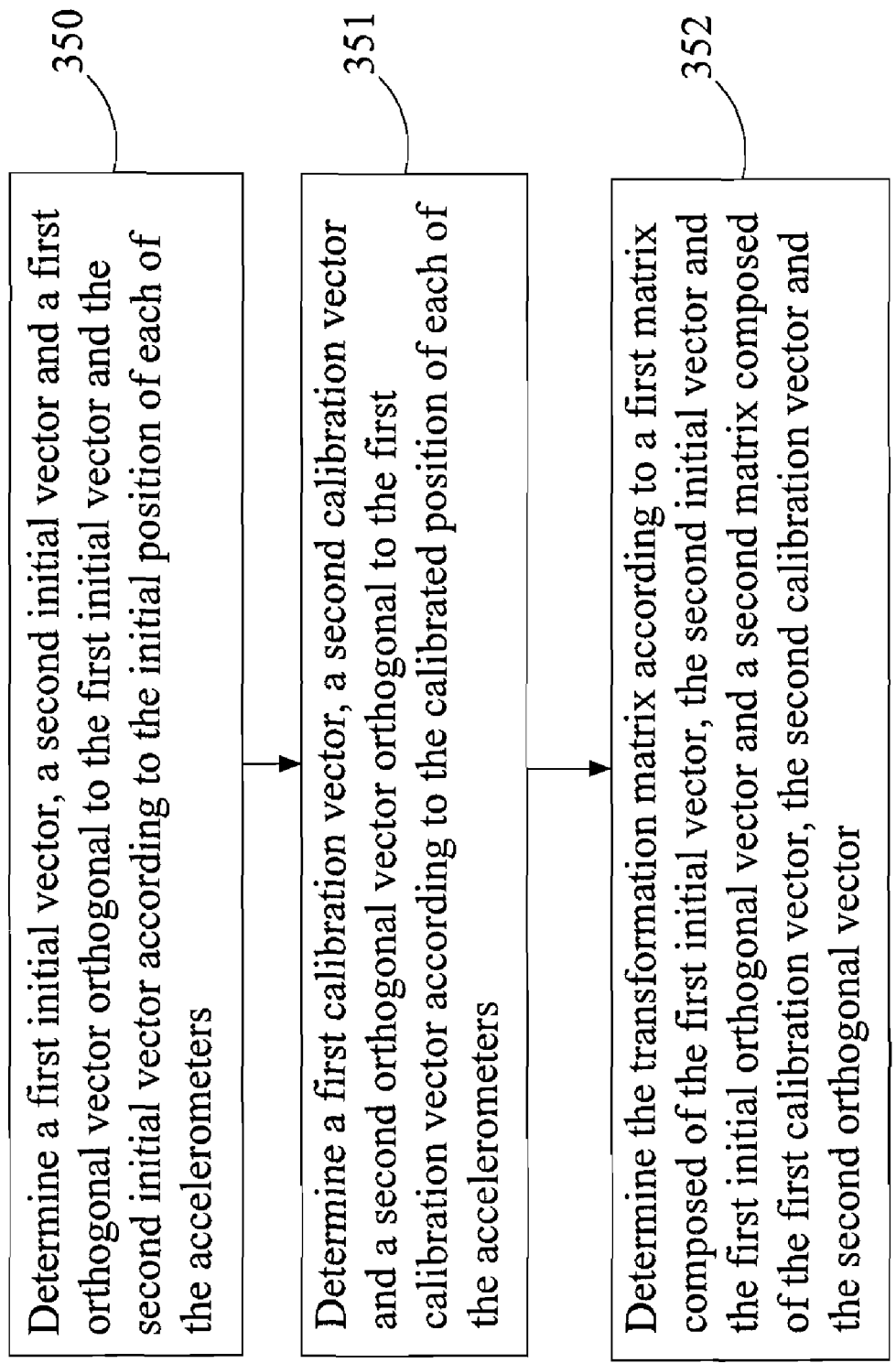
FIG. 6 is a flowchart of a method for obtaining a transformation matrix according to the initial position and the calibrated position.

Then, step 35 is performed to determine a transformation matrix according to the calibrated position and the initial position. More particularly, referring to FIG. 6 for a flowchart of a method for obtaining a transformation matrix according to the initial position and the calibrated position, step 350 is performed to determine a first initial vector $V1(S_{3,0}-S_{1,0})$, a second initial vector $V2(S_{2,0}-S_{1,0})$ and a first orthogonal vector $(V1 \times V2)_0$ orthogonal to the first initial vector and the second initial vector according to the initial position of each of the accelerometers. Step 351 is performed to determine a first calibration vector $V1(S_{3,1}-S_{1,1})$, a second calibration vector $V2(S_{2,1}-S_{1,1})$ and a second orthogonal vector $(V1 \times V2)_1$ orthogonal to the first calibration vector according to the calibrated position of each of the accelerometers at a specific time (for example, at $t_1$). Then, step 352 is performed to determine the transformation matrix according to a first matrix composed of the first initial vector, the second initial vector and the first orthogonal vector and a second matrix composed of the first calibration vector, the second calibration vector and the second orthogonal vector. The transformation matrix is expressed as in Equation (8), wherein $j=1$.

$$[V1(S_{3,j}-S_{1,j}), V2(S_{2,j}-S_{1,j}), (V1 \times V2)] = TM_j \cdot [V1(S_{3,0}-S_{1,0}), V2(S_{2,0}-S_{1,0}), (V1 \times V2)_0] \quad (8)$$

From Equation (8), the transformation matrix $TM_j$ can be obtained as in Equation (9):

$$TM_j \begin{bmatrix} m_{00} & m_{01} & m_{02} \\ m_{10} & m_{11} & m_{12} \\ m_{20} & m_{21} & m_{22} \end{bmatrix} \quad (9)$$

wherein each entry $m_{ij}$ ($i=0-2$, $j=0-2$) in the matrix is known. As shown in FIG. 2, the object may not only move, but also rotates, from the initial position to the first position. The angles ($\alpha$(Yaw)-$\beta$(pitch)-$\gamma$(roll)) can be functions of the entries in the matrix, which can be expressed as in Equation (10):

$$TM_j = \quad (10)$$

$$\begin{bmatrix} \cos\alpha\cos\beta & -\sin\alpha\cos\beta & \sin\beta \\ \sin\alpha\cos\gamma + \cos\alpha\sin\beta\sin\gamma & \cos\alpha\cos\gamma - \sin\alpha\sin\beta\sin\gamma & -\cos\beta\sin\gamma \\ \sin\alpha\sin\gamma - \cos\alpha\sin\beta\cos\gamma & \sin\alpha\sin\beta\cos\gamma + \cos\alpha\sin\gamma & \cos\beta\cos\gamma \end{bmatrix}$$

Finally, in step 36, the rotational angle of the object can be determined according to the transformation matrix in Equations (9) and (10). In other words, $\beta$ can be determined from $m_{02}$, while $\alpha$, $\gamma$ can be obtained according to $m_{01}$ and $m_{12}$. Therefore, the angles $\alpha_1$(Yaw)-$\beta_1$(pitch)-$\gamma_1$(roll) at $t_1$ can be determined. Then, step 32 is repeated to determine the acceleration values $\alpha_{1,1}$, $\alpha_{2,1}$ and $\alpha_{3,1}$, of the object 90 at $t_1$ and calculates the acceleration values $A_{1,1}$, $A_{2,1}$ and $A_{3,1}$ transformed by the transformation matrix $TM_1$ (Equation (9), $j=1$) according to the acceleration values. In other words, the acceleration values $A_{i,j}$ of each of the accelerometers are the product of the acceleration values $G_{i,j}^B$ ($a_{i,j}$) according to Equation (1) multiplied by the transformation matrix according to the calibrated position and the initial position. Then, steps 33-36 are repeated to determine the positions $S_{i,j}$(i=1, 2, 3, j=2), the transformation matrix $TM_2$ at $t_2$ and the angles $\alpha_2$(Yaw)-$\beta_2$(pitch)-$\gamma_2$(roll) according to Equation (10). Repeatedly, the positions $S_{i,j}$(i=1, 2, 3) corresponding to the object and the rotational angles $\alpha_j$(Yaw)-$\beta_j$(pitch)-$\gamma_j$(roll) corresponding to each axis at $t_j$ can be determined so as to reconstruct the motion trajectory of the object. The resolution of the motion trajectory depends on the periods of time between timings.

Although this disclosure has been disclosed and illustrated with reference accelerometer to particular embodiments, the principles involved are susceptible for use in numerous other embodiments that will be apparent to persons skilled in the art. This disclosure is, therefore, to be limited only as indicated by the scope of the appended claims.

What is claimed is:

1. A method for motion tracking, comprising steps of:
   providing at least three accelerometers disposed on an object, the at least three accelerometers being provided with a relative position defined between neighboring accelerometers;
   calculating a second position corresponding to each of the at least three accelerometers by extrapolation after a specific time period according to a first position corresponding to each of the at least three accelerometers and an acceleration value relative to the first position;
   calibrating the second position according to the relative position defined between the neighboring accelerometers so that each of the accelerometers is provided with a calibrated position;
   determining a transformation matrix according to the calibrated position and an initial position corresponding to each of the accelerometers; and
   obtaining a rotational angle of the object according to the transformation matrix.

2. The method for motion tracking as recited in claim 1, wherein each of the accelerometers is a tri-axial accelerometer.

3. The method for motion tracking as recited in claim 1, wherein the second position is calibrated by a method of least squares.

4. The method for motion tracking as recited in claim 1, wherein the step of determining the transformation matrix further comprises steps of:
   determining a first initial vector, a second initial vector and a first initial orthogonal vector orthogonal to the first initial vector and the second initial vector according to the initial position corresponding to each of the accelerometers;
   determining a first calibration vector, a second calibration vector and a second orthogonal vector orthogonal to the first calibration vector and the second calibration vector according to the calibrated position corresponding to each of the accelerometers; and
   determining the transformation matrix according to a first matrix composed of the first initial vector, the second initial vector and the first initial orthogonal vector and a second matrix composed of the first calibration vector, the second calibration vector and the second orthogonal vector.

5. The method for motion tracking as recited in claim 1, wherein the step of obtaining the rotational angle of the object further comprises steps of:
   determining a relation between the object and the rotational angle according to the rotational angle corresponding to a third axis, a second axis and a first axis; and
   determining the rotational angle corresponding to the third axis, the second axis and the first axis based on an algorithm according to the relation between the object and the rotational angle and the transformation matrix.

6. The method for motion tracking as recited in claim 1, wherein the acceleration value of each of the accelerometers is a product of an acceleration signal having experienced consistency calibration and the transformation matrix according to the calibrated position and the initial position.

7. The method for motion tracking as recited in claim 6, wherein the consistency calibration further comprises steps of:
   choosing one from the accelerometers as a reference accelerometer;
   determining a linear transformation matrix between each of the accelerometers and the reference accelerometer; and
   calibrating detection axes of each of the accelerometers according to the linear transformation matrix.

8. A system for motion tracking, comprising:
   at least three accelerometers disposed on a movable object and provided with a relative position defined between neighboring accelerometers, each of the accelerometers being provided with an acceleration signal according to the movable object; and
   a control unit electrically connected to the at least three accelerometers respectively so as to calculate a second position corresponding to each of the at least three accelerometers by extrapolation after a specific time period according to a first position corresponding to each of the at least three accelerometers and an acceleration signal relative to the first position, to calibrate the second position according to the relative position defined between the neighboring accelerometers so that each of the accelerometers is provided with a calibrated position, to determine a transformation matrix according to the calibrated position and an initial position corresponding to each of the accelerometers, and to obtain a rotational angle of the object according to the transformation matrix.

9. The system for motion tracking as recited in claim 8, wherein each of the accelerometers is a tri-axial accelerometer.

10. The system for motion tracking as recited in claim 8, wherein the second position is calibrated by a method of least squares.

11. The system for motion tracking as recited in claim 8, wherein the control unit further determines a relation between the object and the rotational angle according to the rotational angle corresponding to a third axis, a second axis and a first axis, and determines the rotational angle corresponding to the third axis, the second axis and the first axis based on an algorithm according to the relation between the object and the rotational angle and the transformation matrix.

12. The system for motion tracking as recited in claim 11, wherein the relation between the object and the rotational angle is expressed as a matrix composed of sine and cosine functions of the rotational angle corresponding to the third axis, the second axis and the first axis.

13. The system for motion tracking as recited in claim 8, wherein the at least three accelerometers are arranged to form a planar polygon or a three-dimensional polyhedron.

14. The system for motion tracking as recited in claim 8, wherein the acceleration value of each of the accelerometers is a product of an acceleration signal having experienced consistency calibration and the transformation matrix according to the calibrated position and the initial position.

15. The system for motion tracking as recited in claim 14, wherein the consistency calibration further comprises steps of:
choosing one from the accelerometers as a reference accelerometer;
determining a linear transformation matrix between each of the accelerometers and the reference accelerometer; and
calibrating detection axes of each of the accelerometers according to the linear transformation matrix.

* * * * *